US012407977B2

(12) United States Patent
Xiao et al.

(10) Patent No.: US 12,407,977 B2
(45) Date of Patent: Sep. 2, 2025

(54) SPEAKER DEVICE AND HEADPHONE

(71) Applicant: AAC Microtech (Changzhou) Co., Ltd., Jiangsu (CN)

(72) Inventors: Bo Xiao, Changzhou (CN); Ronglin Linghu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 329 days.

(21) Appl. No.: 18/337,421

(22) Filed: Jun. 19, 2023

(65) Prior Publication Data

US 2024/0292145 A1 Aug. 29, 2024

Related U.S. Application Data

(63) Continuation of application No. PCT/CN2023/089519, filed on Apr. 20, 2023.

(30) Foreign Application Priority Data

Feb. 27, 2023 (CN) ......................... 202320345740.3

(51) Int. Cl.

*H04R 1/24* (2006.01)
*H04R 1/10* (2006.01)
*H04R 7/12* (2006.01)
*H04R 7/18* (2006.01)
*H04R 9/02* (2006.01)

(Continued)

(52) U.S. Cl.

CPC ............. *H04R 1/24* (2013.01); *H04R 1/1075* (2013.01); *H04R 7/127* (2013.01); *H04R 7/18* (2013.01); *H04R 9/025* (2013.01); *H04R 9/045* (2013.01); *H04R 9/063* (2013.01); *H04R 2400/11* (2013.01)

(58) Field of Classification Search

CPC ........ H04R 1/24; H04R 1/1075; H04R 7/127; H04R 7/18; H04R 9/025; H04R 9/045; H04R 9/063

See application file for complete search history.

(56) References Cited

U.S. PATENT DOCUMENTS 4,122,315 A * 10/1978 Schroeder ................ H04R 1/24 381/186
5,181,253 A * 1/1993 Jordan ..................... H04R 9/06 381/420

(Continued)

*Primary Examiner* — Suhan Ni
(74) *Attorney, Agent, or Firm* — Wiersch Law Group

(57) ABSTRACT

A headphone includes a housing and a speaker device. The speaker device includes a woofer and a tweeter. The woofer includes a first frame, a first magnetic circuit unit, and a first vibration unit. The tweeter includes a second frame, a second magnetic circuit unit, and a second vibration unit. The first magnetic circuit unit includes an auxiliary magnet close to the second vibration unit. The second magnetic circuit unit includes a central magnet fixed to the second frame and side magnets located at a periphery of the central magnet. A magnetizing direction of the auxiliary magnet and a magnetizing direction of the central magnet are opposite and are arranged along a vibrating direction. Magnetizing directions of the side magnets each point to the central magnet. The speaker device can better satisfy requirements of markets on the size and sound production performance of the headphone.

18 Claims, 4 Drawing Sheets

(51) Int. Cl.
*H04R 9/04* (2006.01)
*H04R 9/06* (2006.01)

(56) References Cited

U.S. PATENT DOCUMENTS

| | | | | |
|---|---|---|---|---|
| 2004/0047478 | A1* | 3/2004 | Combest | H04R 1/24<br>381/182 |
| 2007/0199766 | A1* | 8/2007 | Iwayama | H04R 1/345<br>181/144 |
| 2020/0245058 | A1* | 7/2020 | Lee | H04R 9/025 |

* cited by examiner

A—A

SPEAKER DEVICE AND HEADPHONE

TECHNICAL FIELD

The disclosure belongs to the technical field of electro-acoustic conversion, and particularly relates to a speaker device and a headphone.

BACKGROUND

With the development of various electronic products and the growing demands of users for headphones, more and more requirements are imposed on the quality of headphones. At present, single-driver full-range headphones account for a large proportion in consumer headphones for the maturity and easy production. Unfortunately, the single-driver headphones usually have desirable resolution at low and medium frequency bands, but poor resolution at high frequency bands. Hence, a tweeter is often provided to compensate the resolution effect at the high frequency bands.

In the related art, a structure of a headphone housing is changed if the tweeter is provided in the headphone. Usually, a fixed latch is provided, and the tweeter is arranged in the housing together with a woofer. However, due to a large structural thickness as well as a low sensitivity of the tweeter, the conventional headphones cannot satisfy requirements of markets on sizes and sound production performance of the headphones.

SUMMARY

An objective of the disclosure is to provide a speaker device and a headphone. The speaker device can reduce a whole structural thickness, improve a sensitivity of the tweeter, and better satisfy requirements of markets on the size and sound production performance of the headphone.

The disclosure provides the following technical solutions. The disclosure provides a speaker device. The speaker device includes a woofer and a tweeter at one side of the woofer. The woofer includes a first frame, a first magnetic circuit unit fixed in the first frame, and a first vibration unit fixed to the first frame and spaced apart from the first magnetic circuit unit. The tweeter includes a second frame fixed to the first magnetic circuit unit, a second magnetic circuit unit fixed in the second frame and spaced apart from the first magnetic circuit unit, and a second vibration unit fixed to the second frame and located in a spacing between the first magnetic circuit unit and the second magnetic circuit unit. The first magnetic circuit unit includes an auxiliary magnet close to the second vibration unit. The second magnetic circuit unit includes a central magnet fixed to the second frame and side magnets located at a periphery of the central magnet. A magnetizing direction of the auxiliary magnet and a magnetizing direction of the central magnet are opposite to each other and are arranged along a vibrating direction of the first vibration unit. Magnetizing directions of the side magnets each point to the central magnet.

As an improvement, the second vibration unit includes a tweeter diaphragm with an outer edge fixed to the second frame and a tweeter voice coil fixed to a side of the tweeter diaphragm away from the central magnet.

As an improvement, the side magnets each are an arc structure coaxial with the central magnet. The side magnets are spaced apart from each other at an equal angle around the central magnet.

As an improvement, the second vibration unit, the first magnetic circuit unit and the second frame define a tweeter front cavity. A tweeter sound hole communicating with the tweeter front cavity is formed in a periphery of the second frame. The tweeter further includes a sound leading tube with one end connected to the tweeter sound hole and another end extending radially outward.

As an improvement, the second frame includes a support ring fixed to one side of the first magnetic circuit unit and a sealing cover fixed to a side of the support ring away from the first magnetic circuit unit. The sealing cover clamps and fixes the second vibration unit. The second magnetic circuit unit is fixed in the sealing cover.

As an improvement, an avoiding notch is formed in a side of the support ring close to the sealing cover. The avoiding notch and the sealing cover define the tweeter sound hole.

As an improvement, a tail end of the sound leading tube is aligned with an outer side of the first frame. A width of the sound leading tube increases gradually in a direction away from the tweeter sound hole.

As an improvement, the first vibration unit includes a gasket fixed to the first frame, a woofer diaphragm with an outer ring fixed to the gasket and an inner ring fixed to the first magnetic circuit unit, a dome frame fixed to a side of the woofer diaphragm close to the first magnetic circuit unit, a woofer voice coil fixed to the dome frame, and a flexible printed circuit board (PCB) elastically connected between the dome frame and the first frame and electrically connected to the woofer voice coil.

As an improvement, the first magnetic circuit unit further includes a yoke fixed to the first frame, a main magnet fixed to the yoke, a pole plate fixed to a side of the main magnet away from the yoke, and a central post sequentially passing through the yoke, the main magnet, the pole plate and the auxiliary magnet. The auxiliary magnet is fixed to a side of the pole plate away from the main magnet. A first tweeter pad electrically connected to the tweeter voice coil is provided at a side of the central post close to the tweeter; a second tweeter pad electrically connected to the first tweeter pad is provided at a side of the central post away from the tweeter; and a woofer pad electrically connected to the flexible PCB is provided at an outer side of the first frame.

As an improvement, the disclosure provides a headphone, including a housing and a speaker device fixed in the housing. The speaker device includes a woofer and a tweeter at one side of the woofer. The woofer includes a first frame, a first magnetic circuit unit fixed in the first frame, and a first vibration unit fixed to the first frame and spaced apart from the first magnetic circuit unit. The tweeter includes a second frame fixed to the first magnetic circuit unit, a second magnetic circuit unit fixed in the second frame and spaced apart from the first magnetic circuit unit, and a second vibration unit fixed to the second frame and located in a spacing between the first magnetic circuit unit and the second magnetic circuit unit. The first magnetic circuit unit includes an auxiliary magnet close to the second vibration unit. The second magnetic circuit unit includes a central magnet fixed to the second frame and side magnets located at a periphery of the central magnet. A magnetizing direction of the auxiliary magnet and a magnetizing direction of the central magnet are opposite to each other and are arranged along a vibrating direction of the first vibration unit. Magnetizing directions of the side magnets each point to the central magnet.

As an improvement, the second vibration unit includes a tweeter diaphragm with an outer edge fixed to the second frame and a tweeter voice coil fixed to a side of the tweeter diaphragm away from the central magnet.

As an improvement, the side magnets each are an arc structure coaxial with the central magnet. The side magnets are spaced apart from each other at an equal angle around the central magnet.

As an improvement, the second vibration unit, the first magnetic circuit unit and the second frame define a tweeter front cavity. A tweeter sound hole communicating with the tweeter front cavity is formed in a periphery of the second frame. The tweeter further includes a sound leading tube with one end connected to the tweeter sound hole and another end extending radially outward.

As an improvement, the second frame includes a support ring fixed to one side of the first magnetic circuit unit and a sealing cover fixed to a side of the support ring away from the first magnetic circuit unit. The sealing cover clamps and fixes the second vibration unit. The second magnetic circuit unit is fixed in the sealing cover.

As an improvement, an avoiding notch is formed in a side of the support ring close to the sealing cover. The avoiding notch and the sealing cover define the tweeter sound hole.

As an improvement, a tail end of the sound leading tube is aligned with an outer side of the first frame. A width of the sound leading tube increases gradually in a direction away from the tweeter sound hole.

As an improvement, the first vibration unit includes a gasket fixed to the first frame, a woofer diaphragm with an outer ring fixed to the gasket and an inner ring fixed to the first magnetic circuit unit, a dome frame fixed to a side of the woofer diaphragm close to the first magnetic circuit unit, a woofer voice coil fixed to the dome frame, and a flexible printed circuit board (PCB) elastically connected between the dome frame and the first frame and electrically connected to the woofer voice coil.

As an improvement, the first magnetic circuit unit further includes a yoke fixed to the first frame, a main magnet fixed to the yoke, a pole plate fixed to a side of the main magnet away from the yoke, and a central post sequentially passing through the yoke, the main magnet, the pole plate and the auxiliary magnet. The auxiliary magnet is fixed to a side of the pole plate away from the main magnet. A first tweeter pad electrically connected to the tweeter voice coil is provided at a side of the central post close to the tweeter; a second tweeter pad electrically connected to the first tweeter pad is provided at a side of the central post away from the tweeter; and a woofer pad electrically connected to the flexible PCB is provided at an outer side of the first frame.

The disclosure has the following beneficial effects. According to the solutions, the second vibration unit is located in a spacing between the first magnetic circuit unit and the second magnetic circuit unit. The first magnetic circuit unit includes an auxiliary magnet close to the second vibration unit. The second magnetic circuit unit includes a central magnet fixed to the second frame and side magnets located at a periphery of the central magnet. A magnetizing direction of the auxiliary magnet and a magnetizing direction of the central magnet are opposite to each other and are arranged along a vibrating direction of the first vibration unit. Magnetizing directions of the side magnets each point to the central magnet. A magnetic field formed by a magnetic circuit of the auxiliary magnet and a magnetic field formed by a magnetic circuit of the second magnetic circuit unit are repulsive to each other. This can improve a magnetic flux density of the second vibration unit in a horizontal direction (perpendicular to the vibrating direction), enhance a power conversion factor of the second vibration unit, and make the second vibration unit more sensitive. The tweeter shares the auxiliary magnet of the woofer, such that the thickness of the whole speaker device is reduced. The speaker device can better satisfy requirements of markets on the size and sound production performance of the headphone.

DETAILED DESCRIPTION OF EMBODIMENTS

The disclosure is further described below with reference to the drawings and implementations.

Figure 1:
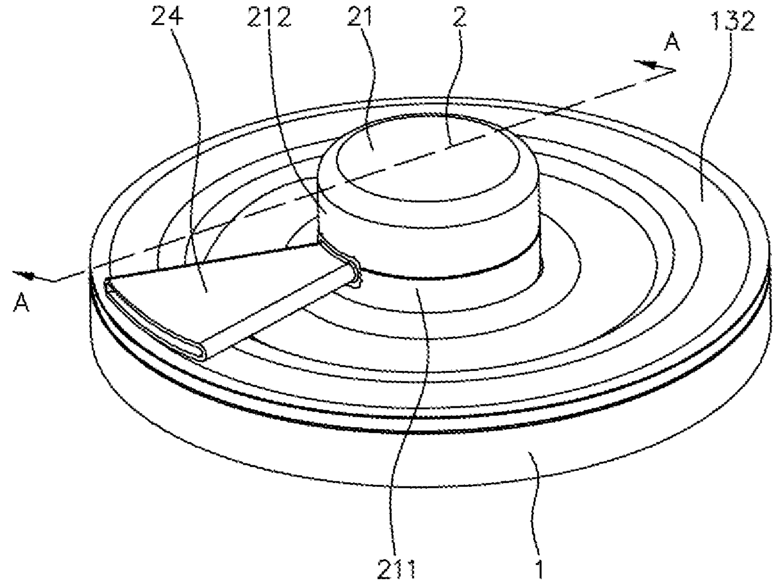
FIG. 1 is an overall structural view of a speaker device from a first viewing angle according to the disclosure.
Figure 2:
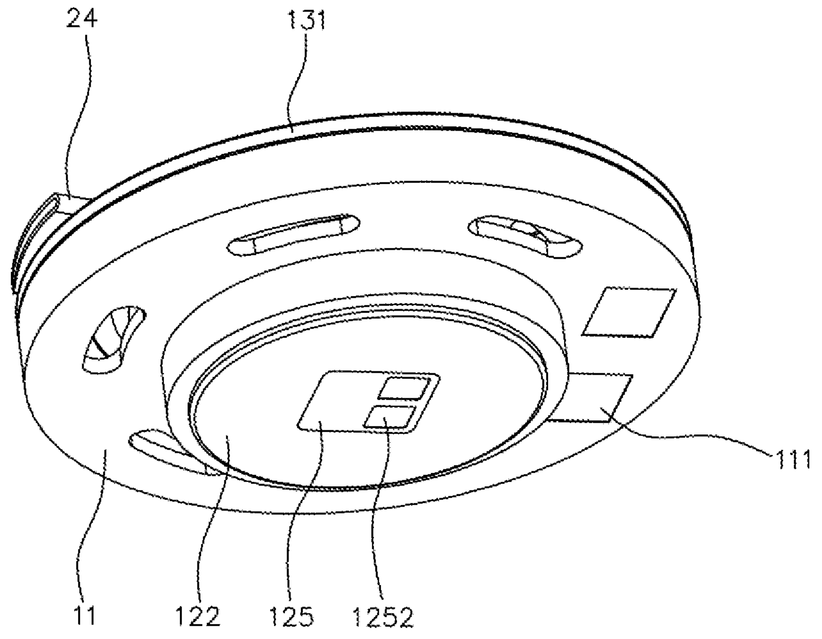
FIG. 2 is an overall structural view of a speaker device from a second viewing angle according to the disclosure.
Figure 3:
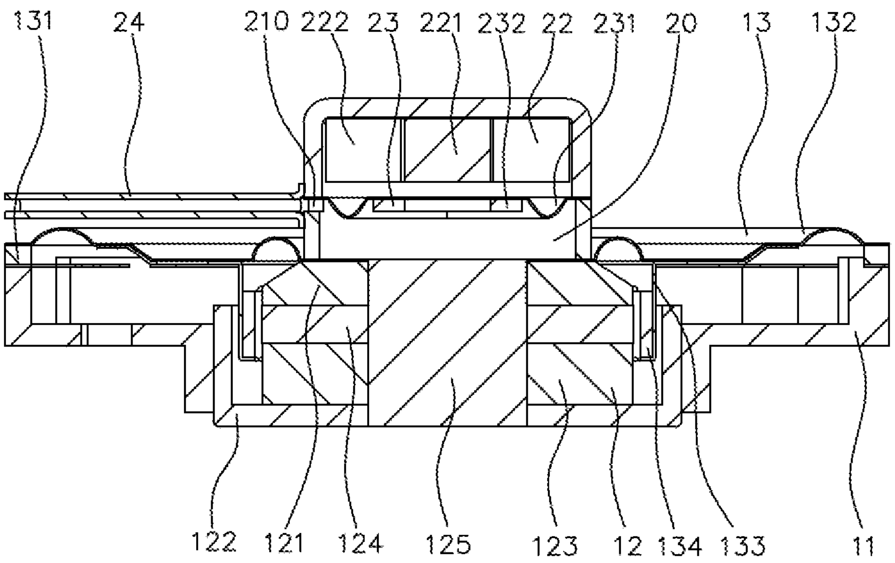
FIG. 3 is a sectional view of a speaker device along a direction A-A shown in FIG. 1 according to the disclosure.
Figure 4:
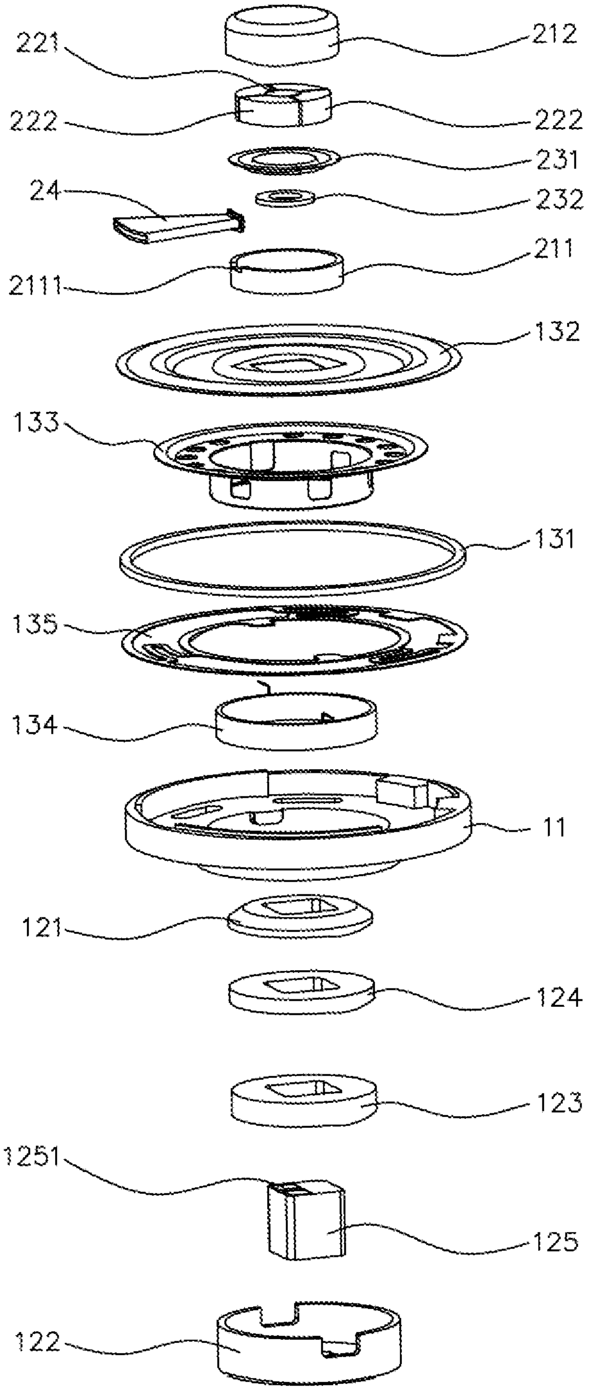
FIG. 4 is a perspective exploded view of a speaker device according to the disclosure.

The disclosure provides a headphone, including a housing (not shown) and a speaker device fixed in the housing. Referring to FIGS. 1-4, the speaker device includes a woofer 1 and a tweeter 2 at one side of the woofer 1. The woofer 1 includes a first frame 11, a first magnetic circuit unit 12 fixed in the first frame 11, and a first vibration unit 13 fixed to the first frame 11 and spaced apart from the first magnetic circuit unit 12. The tweeter 2 includes a second frame 21 fixed to the first magnetic circuit unit 12, a second magnetic circuit unit 22 fixed in the second frame 21 and spaced apart from the first magnetic circuit unit 12, and a second vibration unit 23 fixed to the second frame 21 and located in a spacing between the first magnetic circuit unit 12 and the second magnetic circuit unit 22. The first magnetic circuit unit 12 includes an auxiliary magnet 121 close to the second vibration unit 23. The second magnetic circuit unit 22 includes a central magnet 221 fixed to the second frame 21 and side magnets 222 located at a periphery of the central magnet 221. A magnetizing direction of the auxiliary magnet 121 and a magnetizing direction of the central magnet 221 are opposite to each other and are arranged along a vibrating direction of the first vibration unit 13. Magnetizing directions of the side magnets 222 face the central magnet 221.

According to the solutions, the second vibration unit 23 is located in a spacing between the first magnetic circuit unit 12 and the second magnetic circuit unit 22. The first magnetic circuit unit 12 includes an auxiliary magnet 121 close to the second vibration unit 23. The second magnetic circuit unit 22 includes a central magnet 221 fixed to the second frame 21 and side magnets 222 located at a periphery of the central magnet 221. A magnetizing direction of the auxiliary magnet 121 and a magnetizing direction of the central magnet 221 are opposite and are located in a vibrating direction of the first vibration unit 13. Magnetizing directions of the side magnets 222 each point to the central magnet 221. A magnetic field formed by a magnetic circuit of the auxiliary magnet 121 and a magnetic field formed by a magnetic circuit of the second magnetic circuit unit 22 are repulsive to each other. This can improve a magnetic flux density of the second vibration unit 23 in a horizontal direction (perpendicular to the vibrating direction), enhance a power conversion factor of the second vibration unit 23, and make the second vibration unit 23 more sensitive. The tweeter 2 shares the auxiliary magnet 121 of the woofer 1, such that the thickness of the whole speaker device is reduced. The speaker device can better satisfy requirements of markets on the size and sound production performance of the headphone.

In some embodiments, the second vibration unit 23 includes a tweeter diaphragm 231 with an outer edge fixed to the second frame 21 and a tweeter voice coil 232 fixed to a side of the tweeter diaphragm 231 away from the central magnet 221. The side magnets 222 each are an arc structure coaxial with the central magnet 221. The side magnets 222 are spaced apart from each other at an equal angle around the central magnet 221. For example, the tweeter diaphragm 231 is a circular sheet. The central magnet 221 is a cylinder. The tweeter voice coil and the auxiliary magnet 121 are circular rings. The tweeter diaphragm 231, the tweeter voice coil 232, the central magnet 221 and the auxiliary magnet 121 are coaxial. There are four side magnets 222 spaced apart from each other at the periphery of the central magnet 221. Therefore, the second vibration unit 23 is more stable and reliable. The magnetic flux density between the second magnetic circuit unit 22 and the auxiliary magnet 121 can be stronger to improve the sensitivity of the second vibration unit 23 and achieve better sound production performance. In some embodiments, there may also be three, five or six side magnets 222 at the periphery of the central magnet 221.

In some embodiments, the second vibration unit 23, the first magnetic circuit unit 12 and the second frame 21 define a tweeter front cavity 20. A tweeter sound hole 210 communicating with the tweeter front cavity 20 is formed in a periphery of the second frame 21. The tweeter 2 further includes a sound leading tube 24 with one end connected to the tweeter sound hole 210 and the other end extending radially outward. With the sound leading tube 24, high-frequency sound can be better transmitted, and the tweeter has a better effect.

In some embodiments, the second frame 21 includes a support ring 211 fixed to one side of the first magnetic circuit unit 12 and a sealing cover 212 fixed to a side of the support ring 211 away from the first magnetic circuit unit 12. The sealing cover 212 clamps and fixes the second vibration unit 23. The second magnetic circuit unit 22 is fixed in the sealing cover 212. In some embodiments, the central magnet 221 is coaxially fixed in the sealing cover 212. The side magnets 222 are embedded between an inner wall of the sealing cover 212 and the central magnet 221. An outer edge of the tweeter diaphragm 231 is clamped between the sealing cover 212 and the support ring 211.

In some embodiments, an avoiding notch 2111 is formed in a side of the support ring 211 close to the sealing cover 212. The avoiding notch 2111 and the sealing cover 212 define the tweeter sound hole 210. In some embodiments, the avoiding notch 2111 extends along a periphery of the support ring 211. The tweeter sound hole 210 formed extends along a periphery of the second frame 21, and is shaped as a long flat strip.

In some embodiments, a tail end of the sound leading tube 24 is aligned with an outer side of the first frame 11. A width of the sound leading tube 24 increases gradually in a direction away from the tweeter sound hole 210. In some embodiments, the whole sound leading tube 24 is fan-shaped. An included angle between two sides of the sound leading tube 24 can be adjusted adaptively. With the sound leading tube 24, a frequency band of the tweeter 2 can be adjusted, and the tweeter 2 plays better performance.

In some embodiments, the first vibration unit 13 includes a gasket 131 fixed to the first frame 11, a woofer diaphragm 132 with an outer ring fixed to the gasket 131 and an inner ring fixed to the first magnetic circuit unit 12, a dome frame 133 fixed to a side of the woofer diaphragm 132 close to the first magnetic circuit unit 12, a woofer voice coil 134 fixed to the dome frame 133, and a flexible PCB 135 elastically connected between the dome frame 133 and the first frame 11 and electrically connected to the woofer voice coil 134. Specifically, the woofer diaphragm 132 is located between the support ring 211 and the auxiliary magnet 121.

In some embodiments, the first magnetic circuit unit 12 includes a yoke 122 fixed to the first frame 11, a main magnet 123 fixed to the yoke 122, a pole plate 124 fixed to a side of the main magnet 123 away from the yoke 122, and a central post 125 sequentially passing through the yoke 122, the main magnet 123, the pole plate 124 and the auxiliary magnet 121. The auxiliary magnet 121 is fixed to a side of the pole plate 124 away from the main magnet 123. A first tweeter pad 1251 electrically connected to the tweeter voice coil 232 is provided at a side of the central post 125 close to the tweeter 2. A second tweeter pad 1252 electrically connected to the first tweeter pad 1251 is provided at a side of the central post 125 away from the tweeter 2. A woofer pad 111 electrically connected to the flexible PCB 135 is provided at the outer side of the first frame 11. A conductive contact of the tweeter 2 is led out through the central post 125, such that a client contact pad of the tweeter 2 is located at a same side with the woofer pad 111. This facilitates design of the flexible client contact board.

The above described are merely implementations of the disclosure. It should be noted here that those of ordinary skill in the art may make improvements without departing from the concept of the disclosure, but such improvements should fall within the protection scope of the disclosure.

What is claimed is:

1. A speaker device, comprising a woofer and a tweeter arranged at a side of the woofer, wherein the woofer comprises a first frame, a first magnetic circuit unit fixed in the first frame, and a first vibration unit fixed to the first frame and spaced apart from the first magnetic circuit unit; the tweeter comprises a second frame fixed to the first magnetic circuit unit, a second magnetic circuit unit fixed in the second frame and spaced apart from the first magnetic circuit unit, and a second vibration unit fixed to the second frame and located in a spacing between the first magnetic circuit unit and the second magnetic circuit unit; the first magnetic circuit unit comprises an auxiliary magnet close to the second vibration unit; the second magnetic circuit unit comprises a central magnet fixed to the second frame and side magnets located at a periphery of the central magnet; a magnetizing direction of the auxiliary magnet and a magnetizing direction of the central magnet are opposite to each other and are both arranged along a vibrating direction of the first vibration unit; and magnetizing directions of the side magnets each point to the central magnet.

2. The speaker device as described in claim 1, wherein the second vibration unit comprises a tweeter diaphragm with an outer edge fixed to the second frame and a tweeter voice coil fixed to a side of the tweeter diaphragm away from the central magnet.

3. The speaker device as described in claim 2, wherein the side magnets each are an arc structure coaxial with the central magnet; and the side magnets are spaced apart from each other at an equal angle around the central magnet.

4. The speaker device as described in claim 2, wherein the second vibration unit, the first magnetic circuit unit, and the second frame define a tweeter front cavity; a tweeter sound hole communicating with the tweeter front cavity is formed in a periphery of the second frame; and the tweeter further comprises a sound leading tube with one end connected to the tweeter sound hole and another end extending radially outward.

5. The speaker device as described in claim 4, wherein the second frame comprises a support ring fixed to one side of the first magnetic circuit unit and a sealing cover fixed to a side of the support ring away from the first magnetic circuit unit, wherein the sealing cover clamps and fixes the second vibration unit, and the second magnetic circuit unit is fixed in the sealing cover.

6. The speaker device as described in claim 5, wherein an avoiding notch is formed in a side of the support ring close to the sealing cover; and the avoiding notch and the sealing cover define the tweeter sound hole.

7. The speaker device as described in claim 4, wherein a tail end of the sound leading tube is aligned with an outer side of the first frame; and a width of the sound leading tube increases gradually in a direction away from the tweeter sound hole.

8. The speaker device as described in claim 4, wherein the first vibration unit comprises a gasket fixed to the first frame, a woofer diaphragm with an outer ring fixed to the gasket and an inner ring fixed to the first magnetic circuit unit, a dome frame fixed to a side of the woofer diaphragm close to the first magnetic circuit unit, a woofer voice coil fixed to the dome frame, and a flexible printed circuit board (PCB) elastically connected between the dome frame and the first frame and electrically connected to the woofer voice coil.

9. The speaker device as described in claim 8, wherein the first magnetic circuit unit further comprises a yoke fixed to the first frame, a main magnet fixed to the yoke, a pole plate fixed to a side of the main magnet away from the yoke, and a central post sequentially passing through the yoke, the main magnet, the pole plate and the auxiliary magnet; the auxiliary magnet is fixed to a side of the pole plate away from the main magnet; a first tweeter pad electrically connected to the tweeter voice coil is provided at a side of the central post close to the tweeter; a second tweeter pad electrically connected to the first tweeter pad is provided at a side of the central post away from the tweeter; and a woofer pad electrically connected to the flexible PCB is provided at an outer side of the first frame.

10. A headphone, comprising a housing and a speaker device fixed in the housing, wherein the speaker device comprises a woofer and a tweeter arranged at a side of the woofer, wherein the woofer comprises a first frame, a first magnetic circuit unit fixed in the first frame, and a first vibration unit fixed to the first frame and spaced apart from the first magnetic circuit unit; the tweeter comprises a second frame fixed to the first magnetic circuit unit, a second magnetic circuit unit fixed in the second frame and spaced apart from the first magnetic circuit unit, and a second vibration unit fixed to the second frame and located in a spacing between the first magnetic circuit unit and the second magnetic circuit unit; the first magnetic circuit unit comprises an auxiliary magnet close to the second vibration unit; the second magnetic circuit unit comprises a central magnet fixed to the second frame and side magnets located at a periphery of the central magnet; a magnetizing direction of the auxiliary magnet and a magnetizing direction of the central magnet are opposite to each other and are both arranged along a vibrating direction of the first vibration unit; and magnetizing directions of the side magnets each point to the central magnet.

11. The speaker device as described in claim 10, wherein the second vibration unit comprises a tweeter diaphragm with an outer edge fixed to the second frame and a tweeter voice coil fixed to a side of the tweeter diaphragm away from the central magnet.

12. The speaker device as described in claim 11, wherein the side magnets each are an arc structure coaxial with the central magnet; and the side magnets are spaced apart from each other at an equal angle around the central magnet.

13. The speaker device as described in claim 11, wherein the second vibration unit, the first magnetic circuit unit, and the second frame define a tweeter front cavity; a tweeter sound hole communicating with the tweeter front cavity is formed in a periphery of the second frame; and the tweeter further comprises a sound leading tube with one end connected to the tweeter sound hole and another end extending radially outward.

14. The speaker device as described in claim 13, wherein the second frame comprises a support ring fixed to one side of the first magnetic circuit unit and a sealing cover fixed to a side of the support ring away from the first magnetic circuit unit, wherein the sealing cover clamps and fixes the second vibration unit, and the second magnetic circuit unit is fixed in the sealing cover.

15. The speaker device as described in claim 14, wherein an avoiding notch is formed in a side of the support ring close to the sealing cover; and the avoiding notch and the sealing cover define the tweeter sound hole.

16. The speaker device as described in claim 13, wherein a tail end of the sound leading tube is aligned with an outer side of the first frame; and a width of the sound leading tube increases gradually in a direction away from the tweeter sound hole.

17. The speaker device as described in claim 13, wherein the first vibration unit comprises a gasket fixed to the first frame, a woofer diaphragm with an outer ring fixed to the gasket and an inner ring fixed to the first magnetic circuit unit, a dome frame fixed to a side of the woofer diaphragm close to the first magnetic circuit unit, a woofer voice coil fixed to the dome frame, and a flexible printed circuit board (PCB) elastically connected between the dome frame and the first frame and electrically connected to the woofer voice coil.

18. The speaker device as described in claim 17, wherein the first magnetic circuit unit further comprises a yoke fixed to the first frame, a main magnet fixed to the yoke, a pole plate fixed to a side of the main magnet away from the yoke, and a central post sequentially passing through the yoke, the main magnet, the pole plate and the auxiliary magnet; the auxiliary magnet is fixed to a side of the pole plate away from the main magnet; a first tweeter pad electrically connected to the tweeter voice coil is provided at a side of the central post close to the tweeter; a second tweeter pad electrically connected to the first tweeter pad is provided at a side of the central post away from the tweeter; and a woofer pad electrically connected to the flexible PCB is provided at an outer side of the first frame.

* * * * *